(12) United States Patent
Soerensen

(10) Patent No.: US 11,028,834 B2
(45) Date of Patent: Jun. 8, 2021

(54) GENERATOR FOR A WIND TURBINE

(71) Applicant: Siemens Gamesa Renewable Energy A/S, Brande (DK)

(72) Inventor: Peter Hessellund Soerensen, Brædstrup (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 0 days.

(21) Appl. No.: 16/285,991

(22) Filed: Feb. 26, 2019

(65) Prior Publication Data

US 2019/0277264 A1    Sep. 12, 2019

(30) Foreign Application Priority Data

Mar. 6, 2018  (EP) .................................. 18160324

(51) Int. Cl.
| | | |
|---|---|---|
| F03D 9/00 | (2016.01) | |
| H02P 9/04 | (2006.01) | |
| F03D 80/60 | (2016.01) | |
| F03D 9/25 | (2016.01) | |
| F03D 80/80 | (2016.01) | |
| H02K 9/04 | (2006.01) | |
| H02K 9/18 | (2006.01) | |
| H02K 7/18 | (2006.01) | |
| H02K 1/20 | (2006.01) | |

(52) U.S. Cl.
CPC ............. *F03D 80/60* (2016.05); *F03D 9/25* (2016.05); *F03D 80/80* (2016.05); *H02K 1/20* (2013.01); *H02K 7/1838* (2013.01); *H02K 9/04* (2013.01); *H02K 9/18* (2013.01)

(58) Field of Classification Search
CPC .................................. F03D 80/60; F03D 9/25
See application file for complete search history.

(56) References Cited

U.S. PATENT DOCUMENTS

| 3,995,180 A | 11/1976 | Giles |
|---|---|---|
| 2010/0237727 A1 | 9/2010 | Mantere |

(Continued)

FOREIGN PATENT DOCUMENTS

| CH | 648439 A5 | 3/1985 |
|---|---|---|
| CN | 104600886 A | 5/2015 |
| EP | 0623988 A2 | 11/1994 |

(Continued)

OTHER PUBLICATIONS

European Search Report dated Sep. 28, 2018 for Application No. 18160324.2.

(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

A generator for a wind turbine, a direct drive wind turbine, and a method for manufacturing a generator for a wind turbine is provided. The generator includes a rotor, and a stator, wherein the stator includes a first radial side and a second radial side which is opposite of the first radial side, and wherein the rotor is arranged adjacent to the first radial side. The generator further includes a flow distribution element which is arranged adjacent to the second radial side such that a circumferential flow channel is formed between the flow distribution element and the second radial side.

12 Claims, 4 Drawing Sheets

(56) References Cited

U.S. PATENT DOCUMENTS

2014/0246933 A1 9/2014 Chamberlin
2018/0019642 A1 1/2018 Wang et al.

FOREIGN PATENT DOCUMENTS

| EP | 2234246 A1 | 9/2010 |
| EP | 2648316 A1 | 10/2013 |
| EP | 2958217 A1 | 12/2015 |
| EP | 3244515 A1 | 11/2017 |
| RU | 2396667 C1 | 8/2010 |

OTHER PUBLICATIONS

Non-English Chinese Office Action dated Sep. 3, 2020 for Application No. 201910168684.9.
European Communication Pursuant to Article 94(3) EPC dated May 28, 2020 for Application No. 18 160 324.2.
Chinese Office Action dated Apr. 23, 2021 for Application No. 201910168684.9.

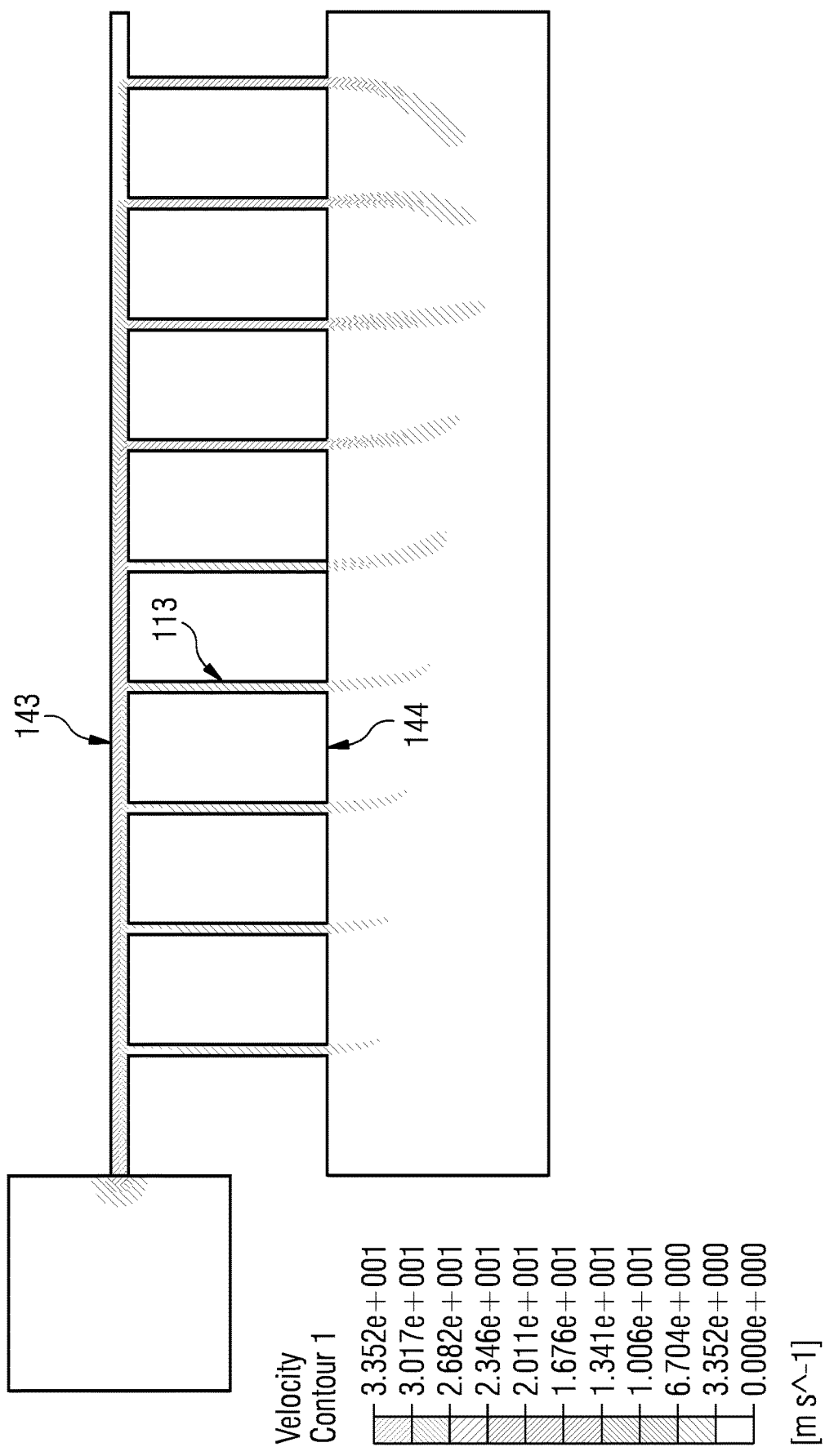

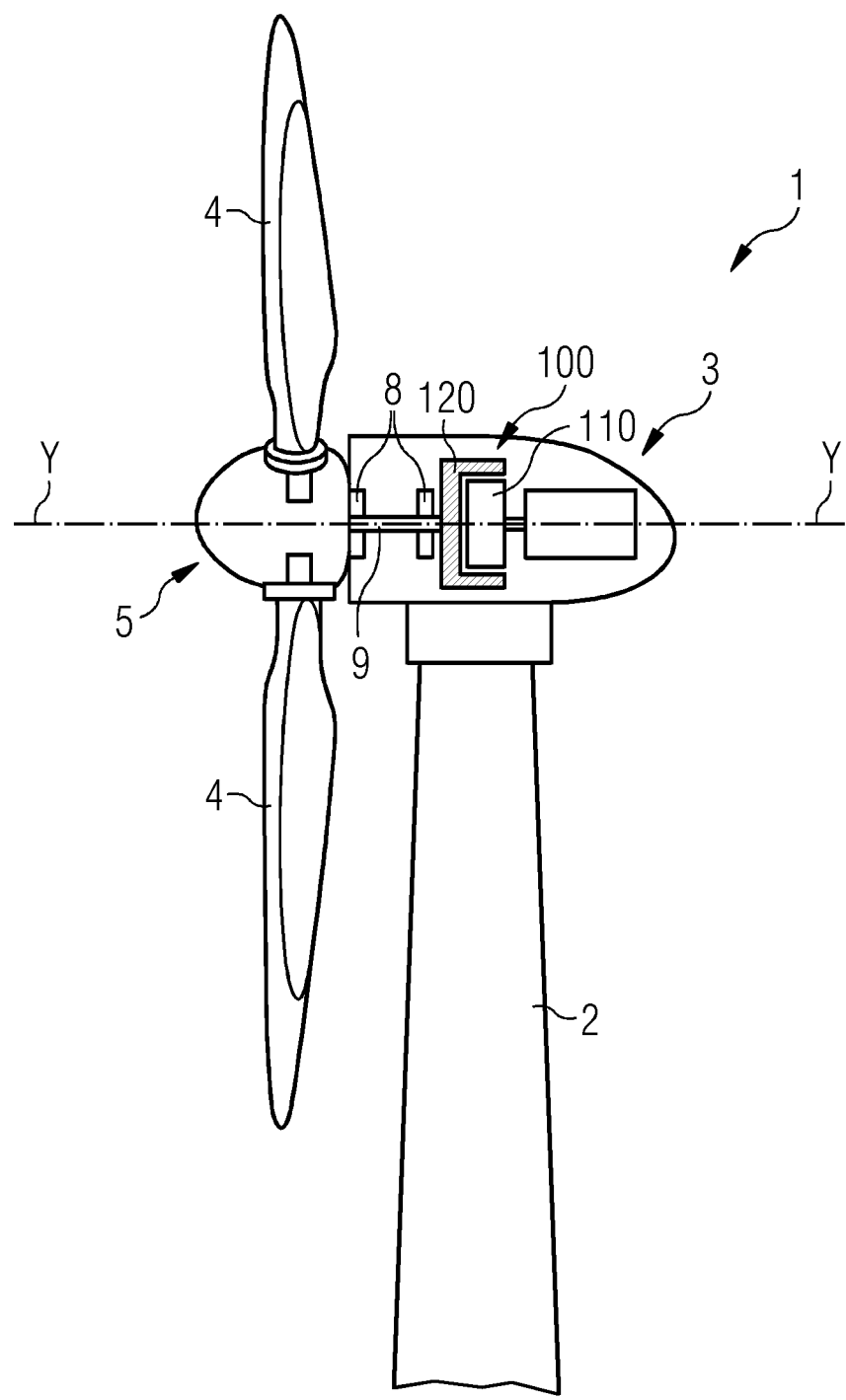

GENERATOR FOR A WIND TURBINE

CROSS-REFERENCE TO RELATED APPLICATIONS

This application claims priority to European application No. 18160324.2, having a filing date of Mar. 6, 2018, the entire contents of which are hereby incorporated by reference.

FIELD OF TECHNOLOGY

The following relates to the field of cooling of a generator for a wind turbine, particularly a direct drive generator. Particularly, the following relates to a generator for a wind turbine, a direct drive wind turbine, and a method for manufacturing a generator for a wind turbine.

BACKGROUND

In today's generators for wind turbines, the flow distribution on the generator is such that the flow is highest in the middle of the generator and lowest close to the winding heads of the stator. Furthermore, the flow velocity on the backside of a stator segment is low causing a low heat transfer coefficient on the backside of the stator segment.

The cooling of a stator in a generator for a wind turbine is crucial for the service life of the generator. Further, the reliability of the generator is a key factor for the operational costs of the wind turbine.

SUMMARY

An aspect relates to a generator for a wind turbine in which the flow is more evenly distributed. Additionally, it may be desirable to increase the velocity on the backside of the segment to improve the thermal performance of the cooling system. Hence, it may be an objective of embodiments of the present invention to provide a generator for a wind turbine with an increased service life, reduced operational costs, and increased thermal performance.

According to a first aspect of embodiments of the present invention, a generator for a wind turbine is described. The generator for a wind turbine comprises a rotor and a stator, wherein the stator comprises a first radial side and a second radial side which is opposite of the first radial side, and wherein the rotor is arranged adjacent to the first radial side. The generator further comprises a flow distribution element, which is arranged adjacent to the second radial side such that a circumferential flow channel is formed between the flow distribution element and the second radial side.

The rotor respectively the stator may be a component of the generator having a circular and hollow shape. The first radial side of the stator may be one of the two circular surfaces forming the stator. The second radial side may be the other one of the two circular surfaces, which lays adjacent and spaced apart from the first radial side. Hence, the stator main body may be formed between the first radial side and the second radial side. It may be understood that the stator does not have to be a circularly closed solid body but may be composed from different segments comprising radial openings in the stator main body.

The rotor being arranged adjacent to the first radial side according to this application may denote that the rotor having a circular main body as well, may be either positioned radially inside the stator or radially outside the stator. Hence, the axis of rotation of the rotor and the axis of rotation of the stator are both congruent. On the one hand, if the rotor is an inner rotor, the radially outer circular surface of the rotor may be adjacent to the radially inner circular surface of the stator. On the other hand, if the rotor is an outer rotor, the radially inner circular surface of the rotor may be adjacent to the radially outer circular surface of the stator.

According to an exemplary embodiment, the rotor may be an outer rotor such that the first radial side of the stator may be the radially outer circular surface of the stator main body.

The flow distribution element may have a circularly closed body and a certain radial extension which is smaller than the axial extension of the flow distribution element. The flow distribution element may ensure that the cooling flow is evenly distributed in the generator.

The flow distribution element being arranged adjacent to the second radial side may denote according to the present application that the flow distribution element is arranged on the opposing radial side of the stator with reference to the rotor. Hence, seen in the radial direction of the generator, the stator is arranged in-between the rotor and the flow distribution element.

The circumferential flow channel may be defined between the flow distribution element and the second radial side of the stator. Hence, the circumferential flow channel may extend along most of the axial extension of the rotor respectively the stator. The axial extension of the circumferential flow channel may be defined by the radial distance between the flow distribution element and the second radial side of the stator at a defined axial position.

According to a further aspect of embodiments of the present invention, a direct drive wind turbine is described. The direct drive wind turbine comprises an above-described generator and a plurality of blades.

According to a further aspect of embodiments of the present invention, a method for manufacturing a generator for a wind turbine is described. The method comprises providing a rotor, and providing a stator. The stator comprises a first radial side and a second radial side which is opposite of the first radial side, wherein the rotor is arranged adjacent to the first radial side. The method further comprises providing a flow distribution element adjacent to the second radial side such that a circumferential flow channel is formed between the flow distribution element and the second radial side.

By placing the flow distribution element on the backside of the stator, the flow distribution on the backside of the stator may be manipulated freely. Hence, it may be possible to decide how much cooling flow goes to the drive end and how much cooling flow goes to the non-drive end. Furthermore, it may be possible to decide how much cooling flow goes through the center of the stator and how much cooling flow goes through the stator plates. Additionally, the heat transfer coefficient on the backside of the stator may be increased, and hence the effective cooling area on the stator may be increased as well.

These advantages may be achieved due to Bernoulli's equation. According to Bernoulli's equation, a high velocity causes a low pressure. Hence, in embodiments of the present invention the flow velocity is manipulated such that the desired flow distribution may be achieved.

The generator for a wind turbine may reduce the cross section of at least one air supply hole in the rotor because the increased pressure drop caused by small holes may be compensated by increasing the flow in the drive end and thus restoring an even flow distribution even with a high pressure drop through the air supply holes on the drive end. The generator may further direct the flow to where the flow is needed the most, i.e. close to the winding heads. Hence, an increased pressure drop on large holes in the rotor at the drive end may be avoided because the cooling may be provided with smaller holes which create an additional air jet for cooling the winding heads on the drive end because of the high air velocity which hits the drive end winding heads.

According to an exemplary embodiment of the present invention, the flow distribution element comprises a base body which comprises a first axial end and a second axial end, and the stator further comprises a first axial stator end and a second axial stator end. Furthermore, the first axial stator end and the second axial stator end are arranged at opposite axial ends of the stator.

The flow distribution element may comprise i.e. a base body having an axial extension extending between the first axial end and the second axial end. The circumferential flow channel may have an axial length being defined as an axial extension of the base body between the first axial end and the second axial end.

The stator may have an axial extension which may generally be greater than a radial extension of the stator, and which may extend between the first axial stator end and the second axial stator end.

Being arranged at opposite axial ends of the stator may denote according to the present application that the axial extension of the stator main body extends between the first axial stator end and the second axial stator end.

According to a further exemplary embodiment of the present invention, the first axial end is distanced to the first axial stator end, and the second axial end is distanced to the second axial stator end.

The first axial end being distanced to the first axial stator end may denote according to the present application that a free axial distance may be provided in-between the first axial end and the first axial stator end such that a first radial flow may be possible between the inside of the stator and the circumferential flow channel.

The second axial end being distanced to the second axial stator end may denote according to the present application that a free axial distance may be provided in-between the second axial end and the second axial stator end such that a second radial flow may be possible between the inside of the stator and the circumferential flow channel.

The first radial flow and the second radial flow are spaced apart from each other by the axial extension of the stator. Additionally, the first radial flow and the second radial flow may be individually adapted dependent on the respective distance between the first axial end and the first axial stator end as well as between the second axial end and the second axial stator end.

On the one hand, the first radial flow and the second radial flow may be equal if required by the cooling conditions needed on the drive end and the non-drive end, respectively. Hence, the distance between the first axial end and the first axial stator end as well as the distance between the second axial end the second axial stator end may be equal.

On the other hand, if required by the cooling conditions needed on the drive end and the non-drive end, respectively, the first radial flow and the second radial flow may be individually adapted and different from each other.

According to a further exemplary embodiment of the present invention, the fluid distribution element further comprises a separation element which extends between the base body and the second radial side. The separation element is fixed to the second radial side.

The flow distribution element may comprise the base body and the separation element which may interconnect the base body with the second radial side of the stator. Hence, a first radial end of the separation element may be formed corresponding to the second radial side of the stator and a second radial end of the separation element may be formed corresponding to the radial outer side of the base body.

Additionally, the separation element may separate the circumferential flow channel in two parts which are not in fluid communication over the separation element. The two parts may particularly be a first part between the first axial end and the separation element as well as a second part between the separation element and the second axial end.

According to a further exemplary embodiment of the present invention, a first axial distance between the first axial end and the separation element is different to a second axial distance between the separation element and the second axial end.

The first axial distance may be defined according to the present application as being the axial length of the first part of the flow distribution element which corresponds to an axial length of the base body in-between the first axial end and the separation element.

The second axial distance may be defined according to the present application as being the axial length of the second part of the flow distribution element which corresponds to an axial length of the base body in-between the separation element and the second axial end.

The first axial distance is different to the second axial distance may denote according to the present application that seen in the axial direction of the generator, the separation element may not be positioned in the exact axial center of the base body but rather nearer to the first axial end or the second axial end. By the first axial distance being different to the second axial distance, the first radial flow and the second radial flow may be individually adapted to the needed boundary conditions as for example the needed amount of cooling fluid at the first axial end and the second axial end, respectively.

According to a further exemplary embodiment of the present invention, a first axial distance between the first axial end and the separation element is equal to a second axial distance between the separation element and the second axial end.

The first axial distance is equal to the second axial distance may denote according to the present application that seen in the axial direction of the generator, the separation element may be positioned in the exact axial center of the base body. Hence, the first radial flow and the second radial flow are identical if the first radial distance between the first axial end and the second radial side of the stator at the first axial end and the second radial distance between the second axial end and the second radial side of the stator at the second axial end are equal. Thus, the flow of cooling fluid in-between the circumferential flow channel may be well-adjusted along the axial extension of the base body.

According to a further exemplary embodiment of the present invention, the base body is formed as a circumferentially closed body.

The base body being formed as a circumferentially closed body may particularly denote according to the present application that the base body may be shaped as a duct without any gaps or openings in the circumferential extension of the base body. Hence, the flow of cooling fluid inside the circumferential flow channel may solely exit the circumferential flow channel in the radial direction of the generator by the first radial flow or the second radial flow. Hence, the circumferentially closed body may be a tube having a cross-sectional shape which is adapted to the needed flow conditions at the specific axial positions in the circumferential flow channel.

According to a further exemplary embodiment of the present invention, seen in a sectional view having a normal being parallel to the axial direction of the stator, a surface of the first axial end and a surface of the second axial end are shaped circular, elliptic, polygonal, star-shaped, star shaped with rounded vertices and/or undulated.

The surface of the first axial end and the surface of the second axial end are defined as having a normal being parallel to the axial extension of the generator.

The surface of the first axial end and the surface of the second axial end may be identical. Hence, the flow cross-section at the first axial end and the flow cross-section at the second axial end may be identical such that the first radial flow and the second radial flow may be similar.

The surface of the first axial end and the surface of the second axial end may be different. Hence, the flow distribution in the first radial flow and the second radial flow may be individually adapted due to the flow cross-section, and dependent on the cooling flow amount and velocity needed at the drive end and the non-drive end, respectively.

According to a further exemplary embodiment of the present invention, an axial extension of the base body between the first axial end and the second axial end is in the shape of a straight line being parallel to the axial direction of the stator, in a sloped straight line being sloped relatively to the axial direction of the stator, a stepped curve, a saw-toothed curve, an undulated curve, or a curve described by an exponential function.

Particularly, the axial extension of the base body may be adapted dependent on the individual amount and velocity of the cooling fluid flow in the circumferential flow channel. If the radial distance between the base body and the second radial side of the stator is larger, the flow velocity of the cooling fluid is lower, and vice versa.

By adapting on the one hand the surface of the first axial end respectively the second axial end and on the other hand the shape of the axial extension of the base body between the first axial end and the second axial end, the amount and velocity of the cooling fluid flow in the circumferential flow channel may particularly be adapted at each single position in the circumferential flow channel dependent on the cooling characteristics needed at each single position.

According to a further exemplary embodiment of the present invention, the stator comprises a plurality of stator segments.

Particularly, each of the plurality of stator segments may be individually exchanged or maintained individually. Hence, in the case of failure, the affected stator segment may be individually disconnected from the remaining stator and exchanged. Therefore, the operational costs may particularly be lower.

According to a further exemplary embodiment of the present invention, the generator further comprises a fan which is arranged inside the stator.

The cooling fluid may be moved through radial gaps inside the stator and subsequently through the circumferential flow channel by the fan. The fan power may be adapted dependent on the needed amount and velocity of the cooling fluid on both radial sides of the stator.

The fan may particularly be arranged at a radially inner position of the stator, particularly radially inside the base body of the flow distribution element.

According to a further exemplary embodiment of the present invention, the flow distribution element comprises a base body which comprises a first axial end and a second axial end, and the stator further comprises a first axial stator end and a second axial stator end. Furthermore, the first axial stator end and the second axial stator end are arranged at opposite axial ends of the stator. The method further comprises determining a shape of an axial extension of the base body dependent on a fluid flow in the circumferential flow channel.

According to a further exemplary embodiment of the present invention, the flow distribution element further comprises a separation element and a base body which comprises a first axial end and a second axial end, the stator further comprises a first axial stator end and a second axial stator end, and the first axial stator end and the second axial stator end are arranged at opposite axial ends of the stator. The method further comprises determining an axial position of a separation element dependent on the fluid flow between the first axial end and the first axial stator end and/or between the second axial end and the second axial stator end.

The fluid flow in the circumferential flow channel may be adapted such that the temperature distribution at the second radial side of the stator is equal. Hence, hot spots may be avoided.

BRIEF DESCRIPTION

Some of the embodiments will be described in detail, with references to the following Figures, wherein like designations denote like members, wherein:

FIG. 4 shows a CFD simulation of a flow distribution without a flow distribution element according to the known art; and FIG. 5 shows a schematic section of a wind turbine including a generator according to an exemplary embodiment.

DETAILED DESCRIPTION

Figure 1:
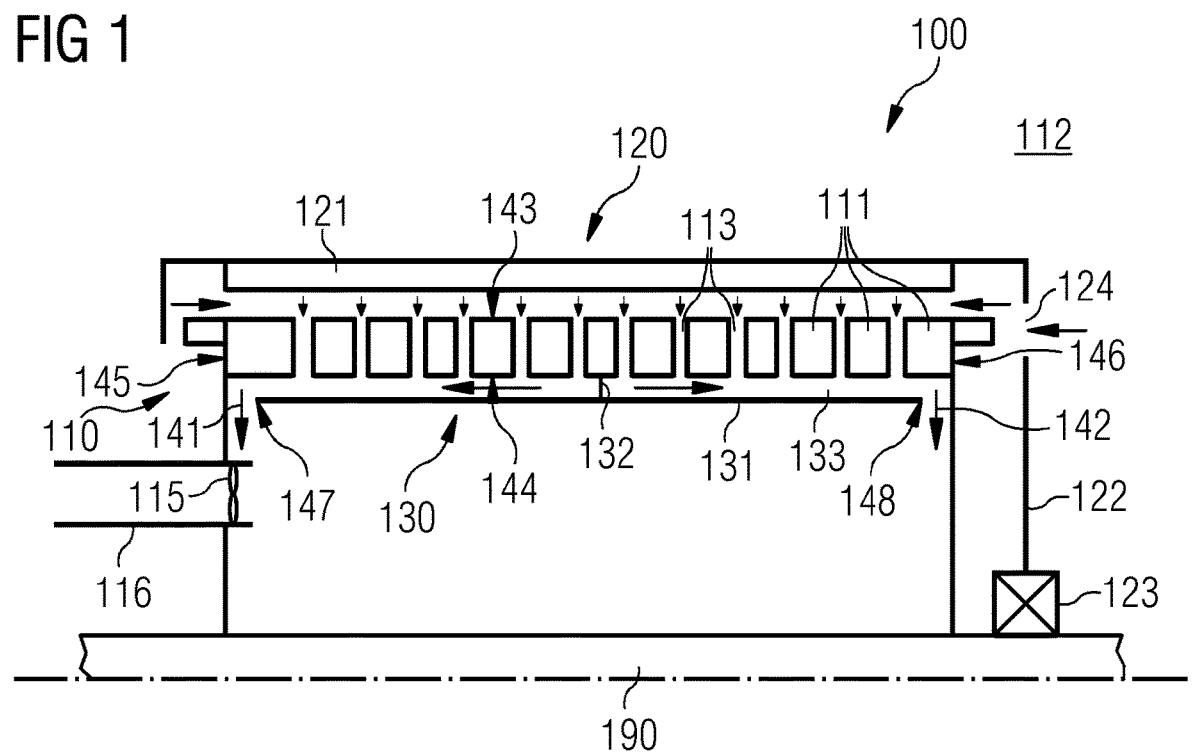
FIG. 1 shows a cross-sectional view of the generator according to an exemplary embodiment.

The illustrations in the drawings are schematically. It is noted that in different figures, similar or identical elements are provided with the same reference signs.

FIG. 1 shows a cross-sectional view of the generator 100 according to an exemplary embodiment.

The generator 100 comprises the rotor 120 formed as an outer rotor 120, and the stator 110 formed as an inner stator 110. The rotor 120 comprises at least one permanent magnet 121 and a rotor housing 122 to which the at least one permanent magnet 121 is fixed. Furthermore, the rotor 120 comprises at least one rotor bearing 123 which supports the rotor 120 rotatable on the generator shaft 190 such that the rotor 120 may rotate relatively to the generator shaft 190.

At one of its axial ends, the rotor 120 further comprises a cooling opening 124 for allowing a cooling fluid, air, entering the inside of the rotor 120.

The stator 110 comprises a plurality of stator laminations 111. In FIG. 1, thirteen stator laminations 111 and two winding heads 112 are depicted. In-between two adjacently disposed stator laminations 111 a radial air duct 113 is formed. Hence, air entering the rotor 120 through the cooling opening 124 flows along the radial inner side of the rotor 120 and through respective air ducts 113 to the inside of the stator 110. Subsequently, the air is guided in the circumferential flow channel 133 and results in the first radial flow 141 and the second radial flow 142.

The stator 111 further comprises a first radial side 143 and a second radial side 144 which is opposite of the first radial side 143. The rotor 120 is positioned opposite of and spaced apart from the first radial side 143. Additionally, the stator 110 comprises the first axial stator end 145 and the second axial stator end 146 which are distanced to each other.

The flow distribution element 130 is arranged opposite to and spaced apart from the second radial side 144. Additionally, the flow distribution element 130 comprises the base body 131 and the separation element 132 which interconnects the base body 131 with the second radial side 144 at one of the plurality of stator laminations 111. The base body 131 comprises a first axial end 147 and a second axial end 148 which are distanced to each other and which delimit the axial extremities of the flow distribution element 130.

The flow distribution element 130 is arranged adjacent to the second radial side 144 such that the circumferential flow channel 133 is formed between the flow distribution element 130 and the second radial side 144.

The first axial end 147 and the first axial stator end 145 are spaced apart from each other such that the first radial flow 141 may be formed by cooling air flowing through this distance. Additionally, the second axial end 148 and the second axial stator end 146 are spaced apart from each other such that the second radial flow 142 may be formed by cooling air flowing through this distance. The first radial flow 141 and the second radial flow 142 subsequently enter a hollow inner space of the stator 110.

The stator further comprises an exhaust 116 in which a fan 115 is arranged such that the fan 115 forces the cooling fluid, particularly air, to flow through the stator 110 for cooling purposes.

In FIG. 1 the base body 131 is formed as an open right circular cylinder having two identical circular end faces. It may be understood that the base body 131 may have any geometrical shape as long as the shape is a circularly closed shape.

In the generator 100 as depicted in FIG. 1, the separation element 132 is arranged at a central axial position between the first axial stator end 145 respectively the first axial end 147 and the second axial stator end 146 respectively the second axial end 148. It may be understood that the separation element 132 may be positioned at any axial position.

Additionally, the separation element 132 has, as shown in FIG. 1, a radial extension being parallel to the radial direction of the generator 100. However, it may be understood that the separation element may additionally be inclined relatively to the radial direction of the generator 100.

The shape of the surface of the first axial end 147, the shape of the surface of the second axial end 148, the inclination of the separation element 132, and the axial position of the separation element 132 are dependent on the amount and velocity of the cooling fluid in the circumferential flow channel 133 which for its part is dependent on where at the second radial side 144 the cooling flow is needed.

Figure 2:
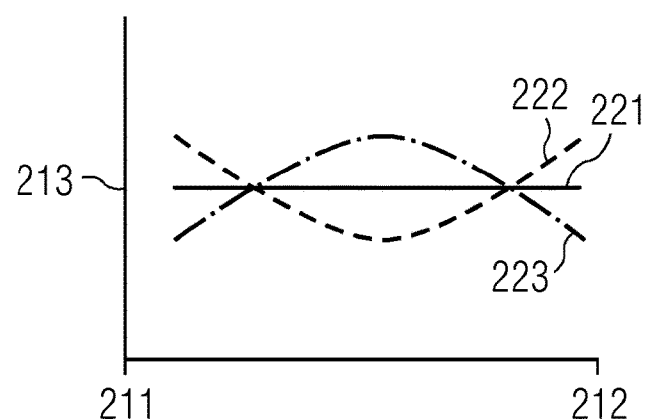
FIG. 2 shows a diagram illustrating the flow distribution between the drive end and the non-drive end in different states according to an exemplary embodiment.

FIG. 2 shows a diagram illustrating the flow distribution between the drive end and the non-drive end in different states according to an exemplary embodiment.

The amount of flow is assigned on the ordinate 213 and the abscissa shows on the left-hand side in FIG. 2 the non-drive end 211 and on the right-hand side in FIG. 2 the drive end 212. In FIG. 2 three different states are depicted. The first state 221 is shown by the continuous line, the second state 222 is depicted by the dashed line, and the third state 223 is shown by the chain dotted line.

The first state 221 shows an even flow distribution between the drive end and the non-drive end which may be achieved by placing the flow distribution element 130 with an optimized radial distance to the second radial side 144 of the stator 110.

As may be clearly seen in the second state 222 the amount of flow is higher at the drive end 211 and the non-drive end 212 than in the central axial position between the drive end 211 and the non-drive end 212. This may result in poor cooling flow in the central axial position.

In the third state 223, the amount of flow is lower at the drive end 211 and the non-drive end 212 than in the central axial position between the drive end 211 and the non-drive end 212. This may result in poor cooling flow at the drive end 211 and the non-drive end 212, respectively.

Figure 3:
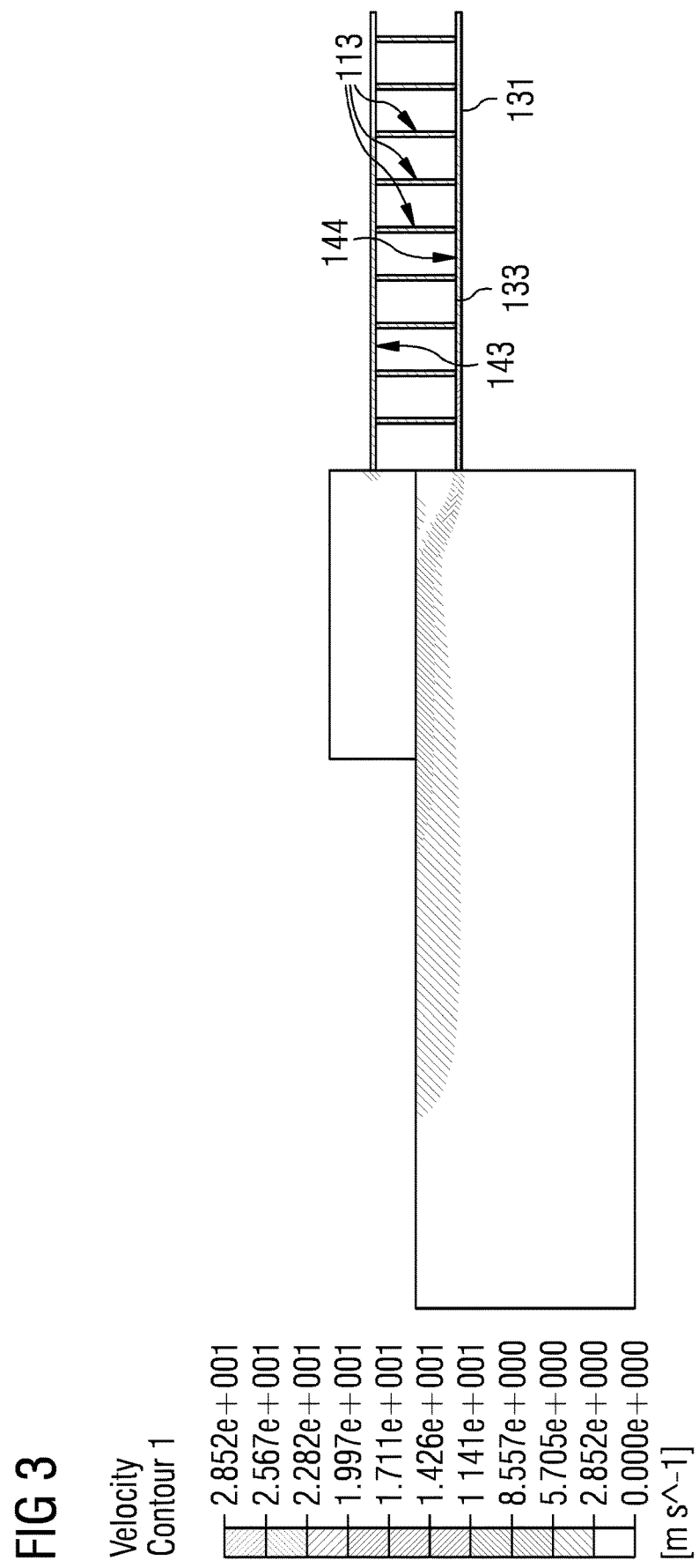
FIG. 3 shows a CFD simulation of a flow distribution with a flow distribution element placed adjacent to the second radial side according to an exemplary embodiment.

FIG. 3 shows a CFD simulation of a flow distribution with a flow distribution element 130 placed adjacent to the second radial side 144 according to an exemplary embodiment.

An even flow distribution is provided inside the circumferential flow channel 133 between the flow distribution element 131 (shown schematically and not in detail in FIG. 3) and the second radial side 144. Additionally, an even flow distribution is provided between the first radial side 143 and the rotor 120 (shown in FIG. 1) and in the air ducts 113.

FIG. 4 shows a CFD simulation of a flow distribution without a flow distribution element according to the known art.

As shown in FIG. 4, there is no cooling flow on the second radial side 144 of the stator. The only cooling flow is provided at the outlets of the air ducts 113. Hence, poor cooling of the second radial side 144 of the stator 110 (shown in FIG. 1) may occur.

FIG. 5 shows a wind turbine 1 according to embodiments of the invention. The wind turbine 1 comprises a tower 2, which is mounted on a non-depicted fundament. A nacelle 3 is arranged on top of the tower 2.

The wind turbine 1 further comprises a wind rotor 5 having three blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y.

The blades 4 extend radially with respect to the rotational axis Y.

The wind turbine 1 comprises a generator 100. The wind rotor 5 is rotationally coupled with the generator 100 by means of a rotatable main shaft 9. A schematically depicted bearing assembly 8 is provided to hold in place the wind rotor 5. The rotatable main shaft 9 extends along the rotational axis Y. The generator 100 includes a stator 110 and a rotor 120. The rotor 120 is rotatable with respect to the stator 110 about the rotational axis Y.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A generator for a wind turbine, comprising:
a rotor, wherein the rotor is an outer rotor;
a stator comprising a plurality of stator laminations, wherein the stator comprises a first radial side and a second radial side which is opposite of the first radial side, wherein the rotor is arranged adjacent to the first radial side, wherein the stator is an inner stator, and in between two adjacently disposed stator laminations, a radial air duct is formed such that cooling fluid entering the rotor through a cooling opening flows along a radial inner side of the rotor and through the respective air ducts to an inside of the stator; and
a flow distribution element which is arranged adjacent to the second radial side such that a circumferential flow channel is formed between the flow distribution element and the second radial side;
wherein the flow distribution element comprises a base body which comprises a first axial end and a second axial end, the stator further comprising a first axial stator end and a second axial stator end, wherein the first axial stator end and the second axial stator end are arranged at opposite axial ends of the stator;
wherein the flow distribution element further comprises a separation element which extends between the base body and the second radial side, and wherein the separation element separates a circumferential flow channel in two parts which are not in fluid communication over the separation element, wherein the two parts of the circumferential flow channel are a first part between the first axial end of the flow distribution element and the separation element and a second part between the separation element and the second axial end of the flow distribution element.

2. The generator according to claim 1, wherein the first axial end is spaced apart from the first axial stator end, and wherein the second axial end is spaced apart from the second axial stator end.

3. The generator according to claim 1, wherein the separation element is fixed to the second radial side.

4. The generator according to claim 3, wherein a first axial distance between the first axial end and the separation element is different to a second axial distance between the separation element and the second axial end.

5. The generator according to claim 3, wherein a first axial distance between the first axial end and the separation element is equal to a second axial distance between the separation element and the second axial end.

6. The generator according to claim 1, wherein the base body is formed as a circumferentially closed body.

7. The generator according to claim 1, wherein seen in a sectional view having a normal being parallel to the axial direction of the stator, a surface of the first axial end and a surface of the second axial end are shaped at least one of: circular, elliptic, polygonal, star-shaped, star shaped with rounded vertices and/or undulated.

8. The generator according to claim 1, wherein an axial extension of the base body between the first axial end and the second axial end is in a shape of a straight line being parallel to an axial direction of the stator, in a sloped straight line being sloped relatively to the axial direction of the stator, at least one of: a stepped curve, a saw-toothed curve, an undulated curve, and a curve.

9. The generator according to claim 1, wherein the stator comprises a plurality of stator segments.

10. The generator according to claim 1, further comprising a fan which is arranged inside the stator.

11. A direct drive wind turbine comprising a generator according to claim 1, and a plurality of blades operably connected to the direct drive wind turbine.

12. A method for manufacturing a generator for a wind turbine, comprising:
providing a rotor, the rotor being an outer rotor;
providing a stator comprising a plurality of stator laminations, wherein the stator comprises a first radial side and a second radial side which is opposite of the first radial side, wherein the rotor is arranged adjacent to the first radial side, wherein the stator is an inner stator, and in between two adjacently disposed stator laminations, a radial air duct is formed such that cooling fluid entering the rotor through a cooling opening flows along a radial inner side of the rotor and through the respective air ducts to an inside of the stator; and
providing a flow distribution element adjacent to the second radial side such that a circumferential flow channel is formed between the flow distribution element and the second radial side;
wherein the flow distribution element comprises a base body which comprises a first axial end and a second axial end, wherein the stator further comprises a first axial stator end and a second axial stator end, wherein the first axial stator end and the second axial stator end are arranged at opposite axial ends of the stator, wherein the method further comprises:
determining a shape of an axial extension of the base body dependent on a fluid flow in the circumferential flow channel;
wherein the flow distribution element further comprises a separation element and a base body which comprises a first axial end and a second axial end, wherein the stator further comprises a first axial stator end and a second axial stator end, wherein the first axial stator end and the second axial stator end are arranged at opposite axial ends of the stator;
wherein the separation element separates a circumferential flow channel in two parts which are not in fluid communication over the separation element, wherein the two parts of the circumferential flow channel are a first part between the first axial end of the flow distribution element and the separation element and a second part between the separation element and the second axial end of the flow distribution element.

\* \* \* \* \*